J. L. LA COUR.
STATOR FOR ALTERNATING ELECTRIC CURRENT MACHINES.
APPLICATION FILED APR. 9, 1914.
1,172,517.
Patented Feb. 22, 1916.
Fig: 1.
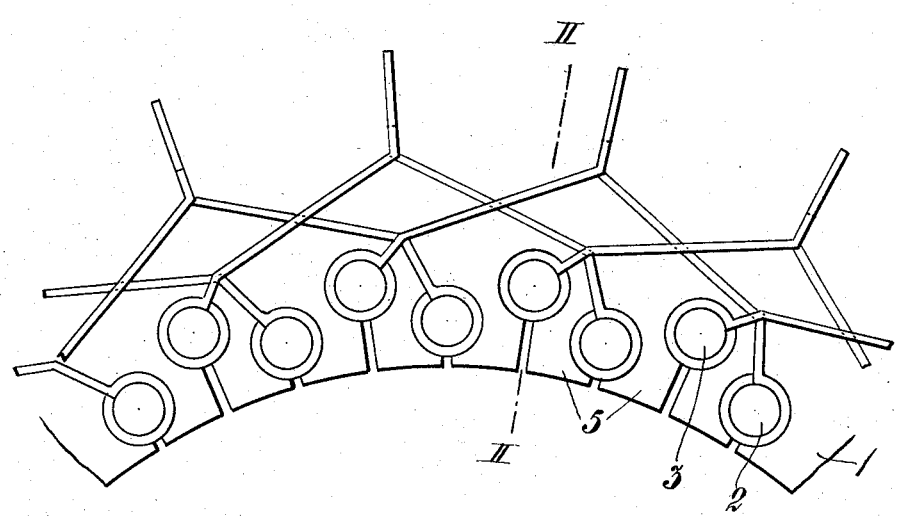
Fig: 2.
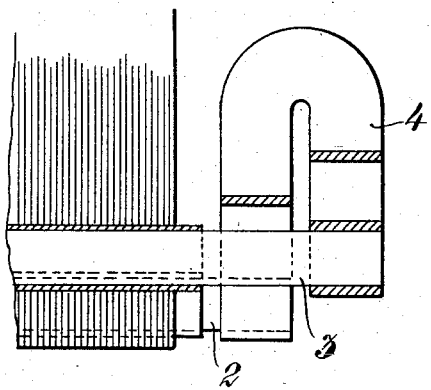
Inventor
Jens Lassen la Cour,
By
Atty

UNITED STATES PATENT OFFICE.

JENS LASSEN LA COUR, OF VESTERÅS, SWEDEN.

STATOR FOR ALTERNATING-ELECTRIC-CURRENT MACHINES.

1,172,517.  Specification of Letters Patent.  Patented Feb. 22, 1916.

Application filed April 9, 1914. Serial No. 830,714.

*To all whom it may concern:*

Be it known that I, JENS LASSEN LA COUR, a citizen of the Kingdom of Sweden, residing at Vesterås, Sweden, have invented new and useful Improvements in Stators for Alternating-Electric-Current Machines, of which the following is a specification.

This invention relates to stators for alternating electric current machines having bar winding.

As is well known it is very advantageous in alternating electric current machines to use one bar only in each slot, the most important advantages of such arrangement being the following: There is no risk that series connected bars are shortcircuited and therefore insulation against the iron core only is required. Such insulation may consist for instance of a tube of paper, micanite or the like. Repairs can be made in a simple and ready manner even in partially or completely closed slots, because the bars together with their insulating tubes can be drawn out from and inserted into the slots from the one end thereof. The coil heads will be well ventilated, simple, and strong, the bars being connected by means of copper strips separated by air spaces. The strips can readily be soldered to the ends of the bars or, when necessary, be removed therefrom. Considerable reduction of the eddy-current losses, created in the bars on account of their own magnetic field.

However, it has heretofore been possible to build alternating electric current machines having one bar only in each slot only in case the machines have a low tension, a high number of kilowatts, and a high number of revolutions, because the number of slots, in most cases, would be too high so that the slots at normal magnetic densities in the teeth would be so narrow that, after deducting the insulation, no or only a small width would remain for the bar. Consequently it would be necessary to make the slots very deep, whereby the teeth losses and the eddy-current losses of the bar would increase in an abnormal manner.

The present invention has for its object to overcome these difficulties and widen the range of utilization of bar windings having one bar only in each slot of a stator core. The invention consists, chiefly, in that the slots are not as hitherto arranged in one row only around and in close proximity to the inner surface of the stator core but in two or more rows arranged in different distances from the said surface, adjacent slots in the different rows being in staggered relation to one another, in order that the desired density in the teeth may not be exceeded.

In the accompanying drawing Figure 1 shows diagrammatically a partial end elevation of one embodiment of the invention, in which are provided two rows of slots, each slot being adapted for one bar only. Fig. 2 shows a partial cross section thereof on the line II—II in Fig. 1.

Referring to the drawing, 1 designates the stator core of an alternating electric current machine, 2, 3, are the bars of a main bar winding disposed in slots in the stator core and comprising one bar only per slot. The ends of said bars are extended outside the stator core as shown in Fig. 2 and connected by end connectors 4 in well known manner. As shown in the drawing the slots containing the bars 2 and 3 are arranged in staggered relation to each other whereby a sufficient number of bars can be disposed around the inner circumference of the stator core without decreasing too much the width of the teeth 5 between the slots containing said bars and without disposing more than one bar in each slot.

It should be understood that the invention is not limited to the constructional form shown in the drawing but that modifications can be made without departing from the essential features of the invention. For instance, the slots may be arranged in more than two rows and the slots need not be open at the inner surface of the stator core as shown in the drawing.

Having thus described my invention, what I claim is:—

A stator for alternating current machines having a slotted core and a main bar winding comprising one bar in each slot, said slots being arranged in rows in different distances from the air-gap, the slots of adjacent rows being in staggered relation to one another, substantially as and for the purpose set forth.

In testimony that I claim the foregoing as my invention, I have signed my name in presence of two subscribing witnesses.

JENS LASSEN LA COUR.

Witnesses:
HENRIK E. NILSSON,
F. G. LITJENROTH.